United States Patent
Han et al.

(10) Patent No.: US 10,820,257 B2
(45) Date of Patent: Oct. 27, 2020

(54) NB-IOT SYNCHRONIZATION SIGNALS WITH OFFSET INFORMATION

(71) Applicant: INTEL IP CORPORATION, Santa Clara, CA (US)

(72) Inventors: Seunghee Han, San Jose, CA (US); Utsaw Kumar, Foster City, CA (US); Debdeep Chatterjee, Mountain View, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/777,641

(22) PCT Filed: Jun. 29, 2016

(86) PCT No.: PCT/US2016/040105
§ 371 (c)(1),
(2) Date: May 18, 2018

(87) PCT Pub. No.: WO2017/119925
PCT Pub. Date: Jul. 13, 2017

(65) Prior Publication Data
US 2018/0376405 A1 Dec. 27, 2018

Related U.S. Application Data

(60) Provisional application No. 62/276,482, filed on Jan. 8, 2016.

(51) Int. Cl.
*H04W 48/08* (2009.01)
*H04J 11/00* (2006.01)
(Continued)

(52) U.S. Cl.
CPC ......... *H04W 48/08* (2013.01); *H04J 11/0069* (2013.01); *H04J 11/0073* (2013.01);
(Continued)

(58) Field of Classification Search
CPC . H04W 48/08; H04W 56/001; H04J 13/0062; H04J 13/107; H04J 11/0069; H04J 11/0073; H04L 5/0053; H04L 67/12
See application file for complete search history.

(56) References Cited

U.S. PATENT DOCUMENTS

2015/0173068 A1 6/2015 Han et al.
2016/0219537 A1* 7/2016 Adhikary ................ H04W 4/70
(Continued)

FOREIGN PATENT DOCUMENTS

WO 2009/008625 1/2009
WO 2011/130630 A1 10/2011
(Continued)

OTHER PUBLICATIONS

Korean IP Office, International Search Report of the International Searching Authority, dated Oct. 12, 2016 for International Application No. PCT/US2016/040105 (7 pgs).

(Continued)

*Primary Examiner* — Curtis A Alia
(74) *Attorney, Agent, or Firm* — Womble Bond Dickinson (US) LLP (57) ABSTRACT

Narrowband Internet of Things synchronization signals are described that carry offset information. In one example an evolved NodeB (eNB) to performs operations to transmit synchronization signals for time and frequency synchronization between the eNB and user equipments (UEs) for narrowband Internet of things (NB-Iot). The operations include concatenating a plurality of short ZadoffChu (ZC) sequences each having a different root index, the ZC sequences being ordered to indicate an offset for use by a UE, generating an NB-Iot Primary Synchronization Signal (NB-PSS) using the concatenation of short ZadoffChu (ZC) sequences, and transmitting the resulting NB-PSS by the (Continued)

eNB in a periodic manner to the UE, wherein, the offset is identified by the order of the ZC sequences.

22 Claims, 3 Drawing Sheets

(51) Int. Cl.
    *H04J 13/10*     (2011.01)
    *H04J 13/00*     (2011.01)
    *H04L 5/00*     (2006.01)
    *H04W 56/00*     (2009.01)
    *H04L 29/08*     (2006.01)

(52) U.S. Cl.
    CPC ........ *H04J 13/0062* (2013.01); *H04J 13/107* (2013.01); *H04L 5/0053* (2013.01); *H04W 56/001* (2013.01); *H04L 67/12* (2013.01)

(56) References Cited

U.S. PATENT DOCUMENTS

2016/0277225 A1* 9/2016 Frenne .............. H04W 56/0015
2017/0135052 A1* 5/2017 Lei ........................ H04L 5/0048

FOREIGN PATENT DOCUMENTS

WO    WO 2015-0173068 A1    10/2011
WO    2017/078827    5/2017
WO    2017/136003    8/2017

OTHER PUBLICATIONS

Korean IP Office, Written Opinion of the International Searching Authority, dated Oct. 12, 2016 for International Application No. PCT/US2016/040105 (9 pgs).
Intel Corporation, "Handling of DC Offset for NB-IoT Downlink." R1-155855, 3GPP TSG-RAN WG1 Meeting #82bis, Malmo, Sweden, Sep. 30, 2015, 3 pages (see pp. 1-2).
Qualcomm Incorporated, "Sequence Design for NB-ioT Sync Channel." R1-157069, 3GPP TSG-RAN WG1 #83, Anaheim, USA, Nov. 7, 2015, 5 pages (see pp. 1-5 and Fig. 3).
Vodafone, et al., "NarrowBand IoT." RP-151931, 3GPP TSG-RAN Meeting #70, Sitges, Spain Dec. 1, 2015, pages (see pp. 4-5).
European Search Report for Application No. 16884129.4-1220/3400663 dated Jul. 30, 2019, 9 pages.
International Preliminary Report on Patentability received for PCT Patent Application No. PCT/US2016/040105, dated Jul. 19, 2018, 11 pages.
European Search Report for Application No. 16884129.4, dated Aug. 19, 2019, 10 pages.
"Sequence Design for NB-ioT Sync Channel" R1-157069, 3GPP TSG-RAN WG1 #83, Nov. 7, 2015, XP051003363.

* cited by examiner

NB-IOT SYNCHRONIZATION SIGNALS WITH OFFSET INFORMATION

CROSS-REFERENCE TO RELATED APPLICATION

This patent application is a U.S. National Phase application under 35 U.S.C. § 371 of International Application No. PCT/US2016/040105, filed on 29 Jun. 2016, entitled NB-IOT SYNCHRONIZATION SIGNALS WITH OFFSET INFORMATION, which claims the benefit of priority to U.S. Provisional Application No. 62/276,482, filed 8 Jan. 2016, the contents of which were incorporated by reference in its entirety.

FIELD

The present description relates to the field of wireless communications and in particular to transmitting identification information in synchronization signals.

BACKGROUND

In the existing LTE (Long Term Evolution) specification, downlink synchronization signals consist of a PSS (Primary Synchronization Signal) and a SSS (Secondary Synchronization Signal). The PSS and SSS are transmitted in the central 6 PRBs (Physical Resource Blocks), which allows UEs to synchronize without any a priori knowledge of the allocated bandwidth. The PSS and SSS are comprised of sequences of length 62 each, mapped to the central 62 subcarriers around the DC (Direct Conversion or zero frequency) subcarrier. PSS sequences are repeated twice in 10 ms (milliseconds) and are used to attain time synchronization and correct frequency offset estimates. Additionally, PSS sequences provide one of the 3 cell IDs (Cell Identifier). The cell IDs are used to identify a particular transmitting eNB or other type of transmitting access point. The two SSS sequences are unique and provide frame synchronization information as well as information about 1 out of the 168 cell IDs.

At the 3GPP (third generation partnership project) RAN #69 meeting, a new WI (work item) on specification support for NB-IoT (Narrowband Internet of Things) was approved with the objective of supporting low complexity devices that support 180 kHz (kilohertz) UE (user equipment) RF (radio frequency) bandwidth. Further, it was agreed as one of the objectives of the WI, to support a single synchronization signal design for three different modes of operation: (1) standalone deployment; (2) NB-IoT deployment in the guard interval of an LTE carrier; and (3) NB-IoT deployed in-band.

Cell search procedure in NB-LTE can be achieved via primary and secondary synchronization signal transmissions by the NB-LTE base stations. Cell search is used in LTE to acquire OFDM (Orthogonal Frequency Division Multiplex) symbol time, frame and frequency synchronization at the UE, while also allowing the UE to detect a Cell ID.

In LTE, 504 unique cell IDs are supported, and these are further divided into 168 cell ID groups, with three cell IDs within each group. The PSS is used to acquire OFDM symbol time and frequency synchronization, while also providing one of the three cell identity groups. The SSS is used to detect the frame boundary as well as 1 out of the 168 cell IDs, which in combination with the cell identity group from PSS gives the Cell ID of the base station.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Various example embodiments provide options for the design of an NB-PSS and an NB-SSS sequence for a reduced complexity NB-LTE receiver, such as a NB-IoT device, a machine-type communications (MTC) device, and/or other suitable electronic devices. Aspects of the example embodiments for the narrowband synchronization signal design include using NB-PSS to detect timing/frequency offset estimates. Example embodiments also provide various options to generate the NB-PSS and NB-SSS. In some embodiments, Zadoff-Chu (ZC) sequences are used to generate in the frequency domain. To cover N different Cell IDs, different root indices may be used.

The present description is directed to NB-IoT (Narrowband Internet of Things) and the techniques described herein are particularly well suited to NB-IOT but may also be applied to other systems including other aspects of LTE and in particular NB-LTE. In the context of the descriptions herein, NB-IoT and NB-LTE may be used interchangeably and the described techniques and structures may be applied to both. Many of the signals described herein, such as NB-PSS and NB-SSS may be exchanged for analogous signals of NB-LTE such as M-PSS and NB-PSS. These signals are also referred to in some contexts as Narrowband PSS (NPSS) and Narrowband SSS (NSSS), respectively.

A unique approach to NB-PSS and NB-SSS is described. For NB-PSS the offset resulting from the channel raster into the NB-PSS may be indicated by the NB-PSS. As described a concatenation of short ZC sequences of different root indices may be used. This involves a careful re-ordering of the root indices used for NB-PSS. For NB-SSS a cell ID may be indicated. In one embodiment a combination of a ZC sequence root index and a scrambling sequence may be used to indicate the cell ID. The sequence occupies one subframe and multiple instances of the NB-SSS sequence within a NB-frame are differentiated via time-domain cyclic shifts. In another embodiment, a long ZC sequence is used for the NB-SSS and it can be sent over one or multiple subframes allocated for NB-SSS in a NB-frame. If sufficient resources are available for NB-SSS within a NB-frame, then the selected ZC sequence may be long enough to accommodate the use of unique ZC sequence roots for Cell IDs.

Downlink Synchronization in LTE

Figure 1:
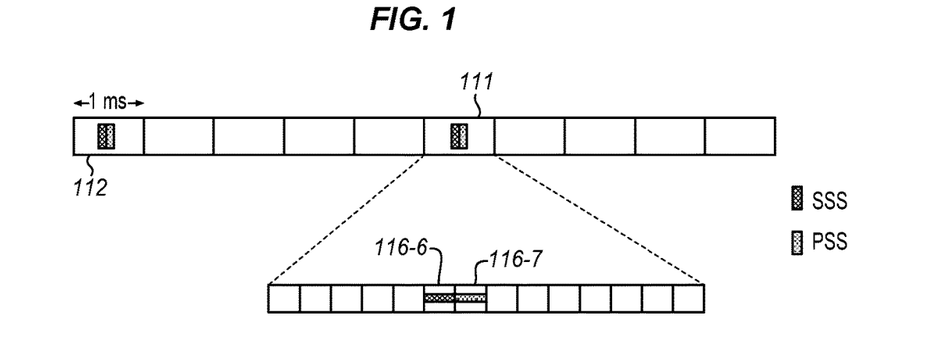
FIG. 1 is a diagram of time domain locations of PSS (Primary Synchronization Signal) and SSS (Secondary Synchronization Signal) transmissions for an FDD (Frequency Division Duplex) system in LTE (Long Term Evolution) wireless communications system.

FIG. 1 is a diagram of time domain locations of PSS and SSS transmissions for an FDD (Frequency Division Duplex) system in LTE. Time is shown on the horizontal axis and each rectangle represents a subframe spanning 1 ms. As shown, an SSS, PSS sequence is sent in every sixth PRB 112, 111. The sixth subframe is expanded into sub-blocks 116 to show the location of the SSS in sub-block 116-6 and the PSS in sub-block 116-7, the sub-blocks correspond to LTE-DL symbols within a subframe.

The downlink synchronization signals consist of PSS and SSS. The PSS and SSS are transmitted in the central 6 PRBs, which allows UEs to synchronize without any a priori knowledge of the allocated bandwidth. The PSS and SSS are comprised of sequences of length 62 each, mapped to the central 62 subcarriers around the DC subcarrier. In particular, the PSS has a length-63 sequence, but one of the 63 elements is punctured making it 62. The LTE SSS has length-62 sequence comprised of two length-31 codes. PSS sequences are repeated twice in 10 ms (milliseconds) and are used to attain time synchronization and correct frequency offset estimates. Additionally, they provide one of the 3 cell IDs. The two SSS sequences are unique and provide frame synchronization information as well as information about 1 out of the 168 cell IDs. The time domain location of the PSS and SSS for an FDD system is illustrated in FIG. 1.

The PSS is constructed from a frequency-domain Zadoff-Chu (ZC) sequence of length 63. The SSS sequences are generated according to maximum length sequences (M-sequences), which can be created by cycling through every possible state of a shift register of length n. Note that the detection of the PSS and SSS enables time and frequency synchronization, provides the UE with the physical layer identity of the cell and the cyclic prefix length, and informs the UE whether the cell uses FDD or TDD (Time Division Duplex).

NB-IOT Cell Search

Cell search in NB-IoT can follow the same design principles as in LTE, but with certain modifications to reduce device complexity and enhance cell search capabilities. Two of these modifications are new synchronization signals. These are identified here as follows:

NB-PSS: One NB-PSS is normally enough to aid the synchronization and cell search procedure towards deriving the Cell ID. The PSS may span over multiple symbols and is used to detect symbol timing and to correct the frequency offset. NB-PSS may be used to indicate channel raster offset as well.

NB-SSS: The NB-SSS is used to achieve frame synchronization and to detect one out of the N cell IDs.

Assuming a value of N cell IDs to support, as indicated above, NB-PSS does not provide information about the cell identity as in LTE. NB-PSS merely provides time synchronization and is used to estimate and compensate for frequency offsets. This frequency offset includes mismatch because of the local oscillator as well as the frequency offset resulting from the channel. To overcome this, the NB-PSS may be modified to carry the information about the offset resulting from channel raster. The sequence design described herein provides this feature.

NB-PSS Sequence Generation

NB-PSS is generated in the frequency domain, occupies $N_{sc}=12$ subcarriers in frequency domain and is spread across $N_{PSS}$ OFDM symbols in time. The NB-PSS is composed of length $N_{ZC}$ root $u_1$ ZC sequences, where $N_{ZC}$ is chosen to be prime.

$$x(n) = e^{-\frac{j\pi u_1 n(n+1)}{N_{ZC}}}, n = 0, 1, \ldots, N_{ZC} - 1 \quad \text{(Eq. 1)}$$

In one embodiment, short ZC sequences of length $N_{sc}=12$ are used that are formed by truncation of ZC sequences of length $N_{ZC}=13$. In another embodiment ZC sequences of length $N_{sc}=12$ are used that are formed by a cyclic extension of sequences of length $N_{ZC}=11$. Each OFDM symbol carries a sequence corresponding to a unique root index. For $N_{PSS}$ symbols in a subframe used for NB-PSS transmission, the root index corresponding to the i-th symbol (i=1, 2, ..., $N_{PSS}$) is given by $u_i$. Thus, the OFDM symbols carry ZC sequences corresponding to root indices ($u_1, u_2, u_{PSS}$).

In another embodiment, each consecutive OFDM symbol pair consists of different root indices across different OFDM symbols. As a special form of the different root indices across different OFDM symbols, the complex conjugate ZC sequence root pair ($u_1, N_{ZC}-u_1$) can be used at every two OFDM symbols. The presence of complex conjugate pairs eliminates the timing ambiguity resulting from integer frequency offsets. Thus the overall structure of NB-PSS may be ($u_1, N_{ZC}-u_1, u_2, N_{ZC}-u_2, u_3, N_{ZC}-u_3, \ldots$). This works well when the number of symbols $N_{PSS}$ is even. When the number of symbols is odd, the last symbol may be a repetition of the previous symbol.

The following two examples illustrate the principles discussed herein:

1. When $N_{PSS}$ is even, for e.g., $N_{PSS}=10$, i.e. when the last 10 symbols of a subframe are used for NB-PSS transmission, the 10 symbols contain ZC root sequence indices (1, 12, 2, 11, 3, 10, 4, 9, 5, 8).

2. When $N_{PSS}$ is odd, for e.g., $N_{PSS}=11$, i.e. when the last 11 symbols of a subframe are used for NB-PSS transmission, the 11 symbols contain ZC root sequence indices (1, 12, 2, 11, 3, 10, 4, 9, 5, 8, 8).

This $N_{PSS}$ symbol NB-PSS sequence can be repeated every $t_{PSS}$ ms in time. Typical values of $t_{PSS}$ are 10 ms, 20 ms, etc. and depend on the repeat of the frame structure.

Figure 2:
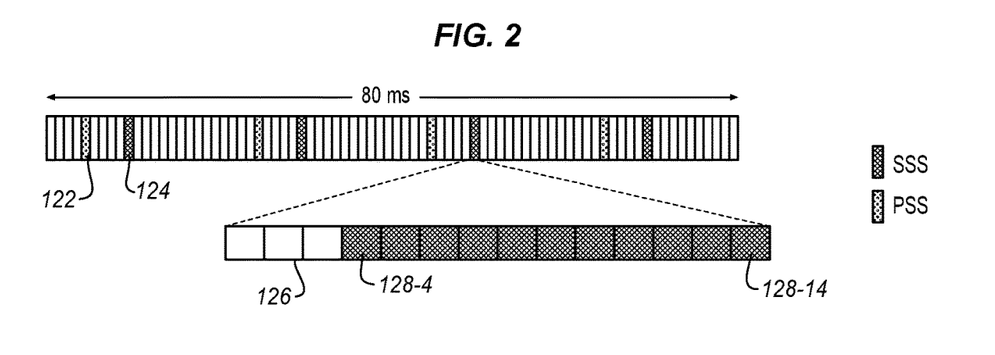
FIG. 2 is a diagram of a frame for wireless communication of NB-SSS with physical resource blocks from left to right through time on the horizontal axis according to an embodiment.

FIG. 2 shows examples of positions and the periodicity for NB-PSS together with NB-SSS, although different positions may be used, depending on the implementation.

Indication of Raster Frequency Offset Using PSS

If an NB-IoT configuration uses a channel raster similar to that of LTE (for e.g. 100 kHz), there may be a misalignment between the center of the NB-IoT physical resource block (PRB) and the closest channel raster if the NB-IoT PRB is to be aligned with the LTE PRB for guard-band/in-band operation modes. For example, in this case, when using the 100 kHz raster, the magnitude of the minimum value of this misalignment can be 2.5 kHz or 7.5 kHz for the even or odd bandwidth configuration for LTE system bandwidth respectively. NB-PSS is used to estimate the frequency offset value. However, the experience, hence estimated, offset consists of both the local oscillator offset as well as the offset between the closest channel raster location and the actual carrier frequency used for NB-IoT. Thus, providing both offsets improves the synchronization in terms of frequency offset correction.

In the NB-PSS generation in the previous section, a different ordering of roots for the different raster offsets can be done. This allows the ordering of the root indices to carry the information regarding raster offset. In one example the order of the root index pairs is reversed to indicate one of two different channel raster offsets. For example:

7.5 kHz: $(u_1, N_{ZC}-u_1, u_2, N_{ZC}-u_2, u_3, N_{ZC}-u_3, \ldots)$
2.5 kHz: $(\ldots, N_{ZC}-u_3, u_3, N_{ZC}-u_2, u_2, N_{ZC}-u_1, u_1)$
and so on.

As another example in order to achieve the complex conjugate property not only across different OFDM symbols but also across the different frequency offset (in the same time), which enables low complexity detection (i.e. one-shot correlator by exploiting complex conjugate property), the ordering of the symbols may be modified. In the following ordering the concatenated sequence is formed of symbol pairs and each symbol pair has a ZC sequence and a complex conjugate of the same ZC sequence. The ordering of the ZC sequence is reversed with respect to the complex conjugate of the ZC sequence to indicate one of two different channel raster offsets. This approach may be combined with the approach above of reversing the order of the sequence of pairs to indicate four different possibilities. An example follows:

7.5 Hz: $(u_1, N_{ZC}-u_1, u_2, N_{ZC}-u_2, u_3, N_{ZC}-u_3, \ldots)$ 2.5 kHz: $(N_{ZC}-N_{ZC}-u_2, u_2, N_{ZC}-u_3, u_3, \ldots)$ NB-SSS Sequence Generation Subframes carrying NB-SSS symbols are spread cross the whole NB-frame. A NB-frame may be 20 ms, 40 ms, 80 ms, etc. depending on the overhead to performance tradeoff in the configuration of the frame. An example of NB-SSS spread across the NB-frame is given in FIG. 2.

FIG. 2 is a diagram of a 80 ms frame with PRBs from left to right through time on the horizontal axis. A time domain location of NB-PSS 122 and NB-SSS 124 transmissions is shown for NB-IoT (d=4). A PRB 126 that contains an NB-SSS is expanded to show the locations of NB-SSS sequences in the sub-blocks of a particular PRB in sub-blocks 128-4 to 128-14. Different sub-blocks may be used to suit different circumstances. In one embodiment the last 11 sub-blocks are used but any number of sub-blocks and any particular sub-blocks may be selected to carry the NB-SSS sequences.

There are different options for generating NB-SSS here. In one example, one long sequence is spread across multiple NB-SSS subframes in the whole NB-frame. In the example in FIG. 2, the NB-frame is 80 ms long and the NB-SSS sequence may be sent over 1 subframe or spread over multiple (e.g., 2, 3, 4) subframes in the 80 ms period. Note that when the NB-SSS is sent over 1 subframe, the NB-frame is 20 ms long, when the NB-SSS is sent over 2 subframes, the NB-frame is 40 ms long and so on.

NB-SSS is also generated in the frequency domain and occupies $N_{sc}=12$ subcarriers in the frequency domain and is spread across $N_{SSS}$ OFDM symbols in time. It is also allocated to occupy $S_{SSS}$ subframes per NB-frame. The NB-SSS is composed of length $N_{ZC}$ ZC sequences, where $N_{ZC}$ is chosen to be prime. However, unlike NB-PSS which is formed of short ZC sequences concatenated in time, NB-SSS is formed of long ZC sequences mapped to one or multiple sets of consecutive $N_{SSS}$ OFDM symbols. The consecutive symbols are spread across one or multiple subframes in a NB-frame.

Assuming $S_{SSS}$ to be the number of subframes allocated for transmitting NB-SSS in a NB-frame. Then, the following options exist, inter alia, for the length of the ZC sequence $N_{ZC}$:

1. $N_{ZC} < N_{SSS}*N_{sc}*S_{SSS}$: In this case, $N_{ZC}$ can to be chosen as the highest prime number less than $N_{SSS}*N_{sc}*S_{SSS}$. The sequence can be padded with zeros or cyclically extended to the required length.

2. $N_{ZC} > N_{SSS}*N_{sc}*S_{SSS}$: In this case, $N_{ZC}$ can be chosen as the least prime number greater than $N_{SSS}*N_{sc}*S_{SSS}$. The sequence can then be truncated to the required length.

Different roots can be used to indicate the Cell ID. However, $N_{ZC}$ might or might not be sufficient to indicate all of the required number of Cell IDs, say N. In another embodiment, the cell IDs can be indicated by using scrambling codes or frequency domain cyclic shifts. This circumstance may be considered as presenting two cases.

The first case is identified as $N_{ZC} > N$. In other words there are more ZC sequences available to use than there are cell IDs. In this case, the NB-SSS sequence is given as:

$$s(n) = e^{-\frac{j\pi p n'(n'+1)}{N_{ZC}}}, n = 0, 1, \ldots, N_{SSS}*N_{sc}*S_{SSS} - 1, \quad \text{(Eq. 2)}$$
$$n' = n \bmod N_{ZC}$$

where $p=0, 1, \ldots, N-1$ indicates the Cell ID. An example of this case would be when 4 subframes per NB-frame are allocated for NB-SSS transmission. Thus for this case, $N_{SSS}=11$, $N_{sc}=12$, $S_{SSS}=4$, $N_{SSS}*N_{sc}*S_{SSS}=528$. $N_{ZC}$ may be chosen to be 523, which is a prime number. This gives sufficient length to allocate unique roots for N=504 Cell IDs.

The second case is identified as $N_{ZC} < N$. In this case, the NB-SSS sequence length is not sufficient to indicate N Cell IDs. Thus, the root of the sequence will not completely indicate the cell ID information. There are two or more ways to address this.

One way is to embed the additional information in a scrambling sequence. In this case the NB-SSS sequence is given as:

$$s(n) = b_{k_p}(n) e^{-\frac{j\pi m_p n'(n'+1)}{N_{ZC}}}, \quad \text{(Eq. 3)}$$
$$n = 0, 1, \ldots, N_{SSS}*N_{sc}*S_{SSS} - 1,$$
$$n' = n \bmod N_{ZC},$$

where $a_p(n)$ represents the scrambling sequence and:

$$m_p = 1 + \bmod(p, N_{ZC}), \quad \text{(Eq. 4)}$$
$$k_p = \left\lfloor \frac{p}{N_{ZC}} \right\rfloor, \quad \text{(Eq. 5)}$$

$p=0, 1, \ldots, N-1$. Note that $m_p$ takes the values from $\{1, \ldots, N_{ZC}\}$, while $k_p$ takes on the values $$\left\{0, 1, 2, \ldots, \left\lfloor \frac{N-1}{N_{ZC}} \right\rfloor\right\}.$$

An example of this case would be when $S_{SSS}=2$ subframes per NB-frame are allocated for NB-SSS transmission. Thus for this case, $N_{SSS}=11$, $N_{sc}=12$, $S_{SSS}=2$, $N_{SSS}*N_{sc}*S_{SSS}=264$. $N_{ZC}$ can be chosen to be 263, which is a prime number. With just 2 scrambling sequences, all N=504 Cell IDs can be covered.

A second way is to embed the additional cell ID information in a frequency domain cyclic shift applied to the ZC sequence. In this case the NB-SSS sequence is given as:

$$s(n) = e^{-\frac{j\pi m_p n'(n'+1)}{N_{ZC}}}, \qquad \text{(Eq. 6)}$$

$$n = 0, 1, \ldots, N_{SSS} * N_{sc} * S_{SSS} - 1,$$

$$n' = (n + CS) \bmod N_{ZC},$$

where CS represents the cyclic shift and:

$$m_p = 1 + \bmod(p, N_{ZC}), p = 0, 1, \ldots, N-1. \qquad \text{(Eq. 7)}$$

An example of this case would be when $S_{SSS}=2$ subframes per NB-frame are allocated for NB-SSS transmission. Thus for this case, $N_{SSS}=11$, $N_{sc}=12$, $S_{SSS}=2$, $N_{SSS}*N_{sc}*S_{SSS}=264$. $N_{ZC}$ can be chosen to be 263, which is a prime number. Using 263, as many as 504 Cell IDs (N=504) can be easily covered using two cyclic shifts CS=0, 131

The present detailed description refers to the accompanying drawings. The same reference numbers may be used in different drawings to identify the same or similar elements. In the description, for purposes of explanation and not limitation, specific details are set forth such as particular structures, architectures, interfaces, techniques, etc. in order to provide a thorough understanding of the various aspects of the claimed embodiments. However, it will be apparent to those skilled in the art having the benefit of the present disclosure that the various aspects of the claimed embodiments may be practiced in other examples that depart from these specific details. In certain instances, descriptions of well-known devices, circuits, and methods are omitted so as not to obscure the description of the embodiments with unnecessary detail.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 7:
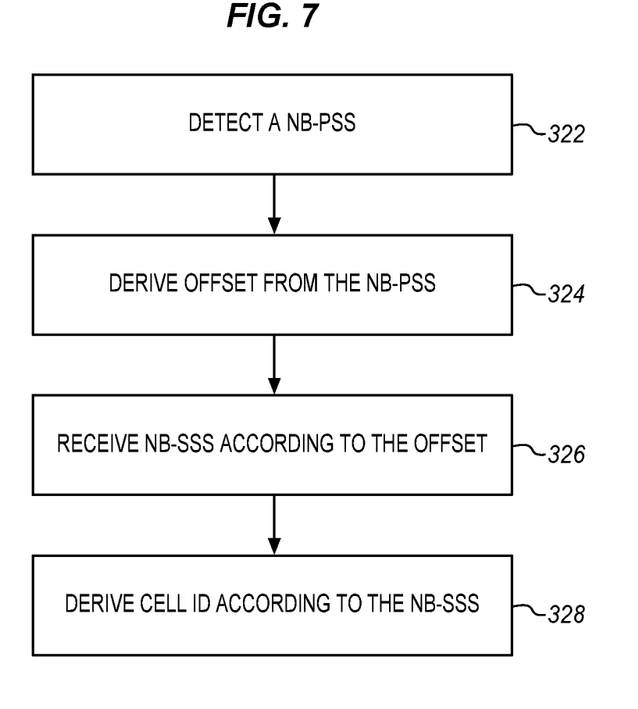
FIG. 7 is a process flow diagram of receiving and processing an NB-PSS and an NB-SSS according to an embodiment.

Embodiments described herein may be implemented into a system using any suitably configured hardware and/or software. FIG. 7 illustrates, for one embodiment, example components of a User Equipment (UE) device 100 or a BS. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second (2G) and third generation (3G) baseband processor 104a, a fourth generation (4G) baseband processor 104b, and/or other baseband processor(s) 104c for other existing generations, generations in development or to be developed in the future (e.g., fifth generation (5G), 6G, etc.).

The baseband circuitry 104 (e.g., one or more of baseband processors 104a-c) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers.

In some embodiments, the baseband circuitry may include one or more audio digital signal processor(s) (DSP) 104f. The audio DSP(s) 104f may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

The baseband circuitry 104 may further include memory/storage 104d. The memory/storage 104d may be used to load and store data and/or instructions for operations performed by the processors of the baseband circuitry 104. The data and instructions may be read by the processors and are stored in a computer-readable format in the memory or storage medium of 104d or in the individual processors or elsewhere to cause the processors to perform the operations described herein. Memory/storage for one embodiment may include any combination of suitable volatile memory and/or non-volatile memory. The memory/storage 104g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 104g may be shared among the various processors or dedicated to particular processors.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the 1-BM circuitry 108 may include a TX/RX switch to switch between transmit mode and receive mode operation. The FEM circuitry may include a receive signal path and a transmit signal path. The receive signal path of the 1-BM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In embodiments where the electronic device 100 is, implements, is incorporated into, or is otherwise part of an evolved nodeB (eNB), baseband circuitry 104 may be to generate a narrowband secondary synchronization signal (N-SSS) using a Zadoff-Chu (ZC) sequence, wherein a length of the ZC sequence is less than or equal to 73 resource elements; and control radio frequency (RF) circuitry to transmit the N-SSS. The RF circuitry 106 may be to transmit the N-SSS.

In embodiments where the electronic device 100 is, implements, is incorporated into, or is otherwise part of a user equipment (UE), baseband circuitry 104 may be to detect a primary synchronization signal (PSS) received by the RF circuitry 106; derive an offset from the detected PSS; and process a secondary synchronization signal (SSS) and derive a cell ID.

Figure 3:
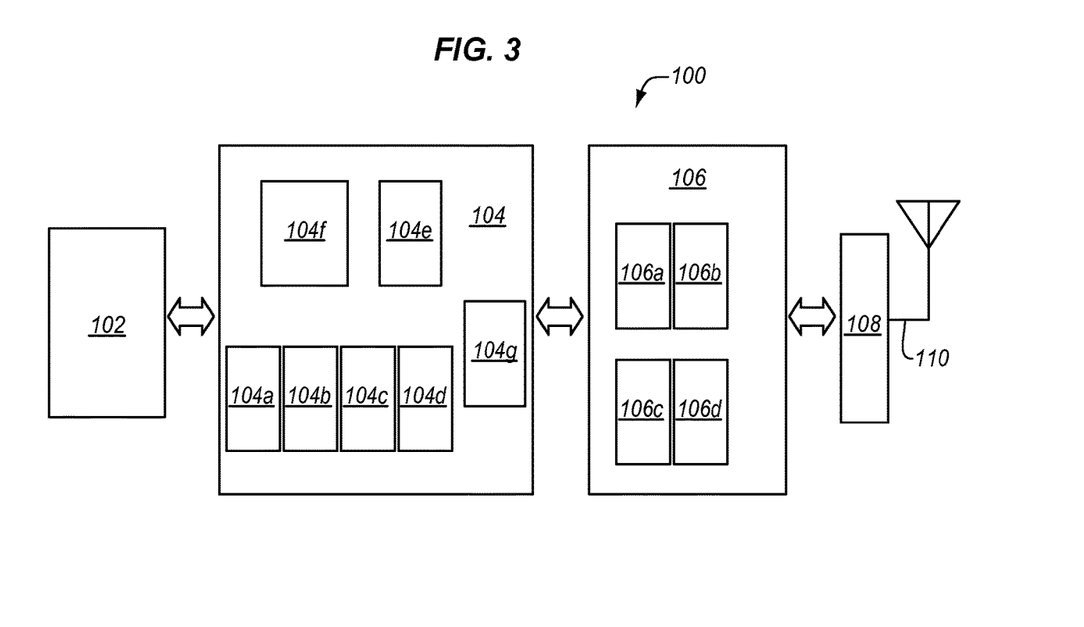
FIG. 3 is a block diagram of an electronic device, such as UE, IOT device, or eNB according to an embodiment.
Figure 4:
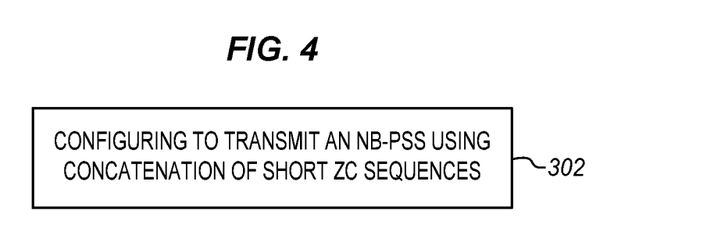
FIG. 4 is a process flow diagram of configuring a device to transmit an NB-PSS according to an embodiment.

FIG. 4 is a process flow diagram showing operations that may be performed by the electronic device of FIG. 3. The device may be configured to perform one or more processes, techniques, and/or methods as described herein, or portions thereof. One such process is depicted in FIG. 4. For example, the process may include configuring 302, by an evolved nodeB (eNB), to transmit NB-Iot Primary Synchronization Signals (N-PSS) from a cell using a concatenation of short Zadoff-Chu (ZC) sequences. The offset may be uniquely identified via the ordering of the roots of the ZC sequences.

Figure 5:
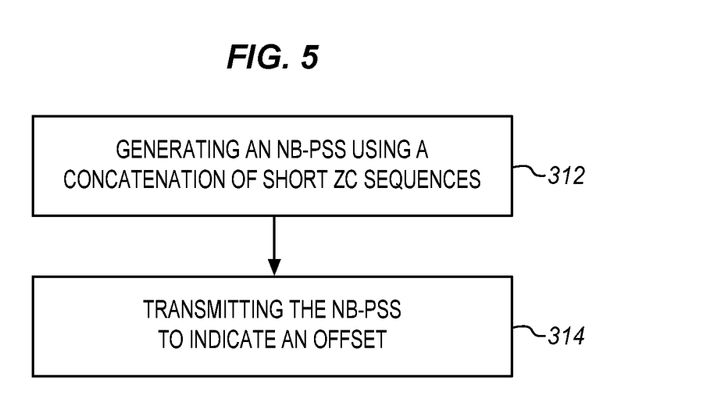
FIG. 5 is a process flow diagram of transmitting NB-PSS to facilitate time and frequency synchronization according to an embodiment.

In some embodiments, the electronic device of FIG. 3 may be configured to perform one or more processes, techniques, and/or methods as described herein, or portions thereof. One such process is depicted in FIG. 5. For example, the process may include generating 304, by an evolved nodeB (eNB), a narrowband primary synchronization signal (N-PSS) using a concatenation of short Zadoff-Chu (ZC) sequences. The process may include transmitting 306 the N-PSS to indicate an offset.

Figure 6:
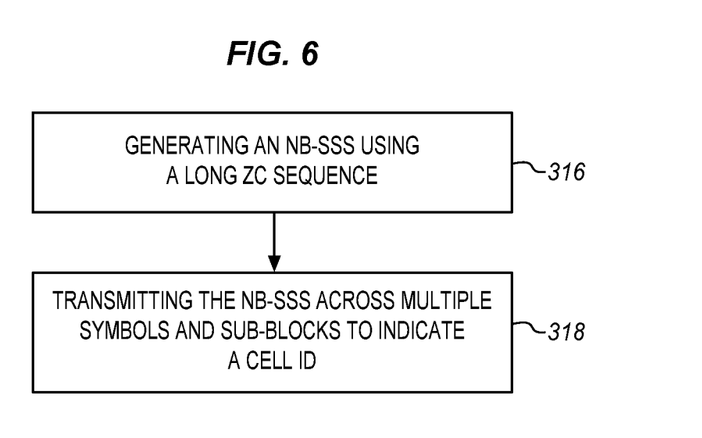
FIG. 6 is a process flow diagram of transmitting NB-SSS to facilitate time and frequency synchronization according to an embodiment.

In some embodiments, the electronic device of FIG. 3 may be configured to perform one or more processes, techniques, and/or methods as described herein, or portions thereof. One such process is depicted in FIG. 6. For example, the process may include generating 316, by an evolved nodeB (eNB), a narrowband secondary synchronization signal (N-SSS) using a long Zadoff-Chu (ZC) sequence. The process may include transmitting 318 the N-PSS to indicate a cell ID.

In some embodiments, the electronic device of FIG. 3 may be configured to perform one or more processes, techniques, and/or methods as described herein, or portions thereof. One such process is depicted in FIG. 7. For example, the process may include detecting 322 a NB-PSS (primary synchronization signal); deriving 310 an offset from the detected PSS; receiving 326 a NB-SSS according to the offset, and deriving 328 a cell ID according to the SSS.

EXAMPLES

Example 1 may include a system and/or method of wireless communication for synchronization signal and channel for narrowband internet of things (NB-IOT), comprising configured, by an evolved NodeB (eNB), to transmit NB-IOT Primary Synchronization Signal (NB-PSS) using concatenation of short Zadoff Chu (ZC) sequences.

Example 2 may include the method of example 1 and/or other examples herein, wherein consecutive symbol pairs carry complex conjugate ZC sequence root pair for all symbols when even number of NB-PSS symbols are present.

Example 3 may include the method of example 1 and/or other examples herein, wherein consecutive symbol pairs carry complex conjugate ZC sequence root pair for all symbols except the last symbol.

Example 4 may include the method of example 3 and/or other examples herein, wherein the last symbol carries a root sequence from one of the earlier symbols.

Example 5 may include the method of example 1 and/or other examples herein, wherein the raster frequency offset is carried by the NB-PSS sequence Example 6 may include the method of example 5 and/or other examples herein, wherein the root sequence ordering determines the raster frequency offset.

Example 7 may include a system and method of wireless communication for synchronization signal and channel for NB-IOT, comprising configured, by an eNB, to transmit NB-IOT Secondary Synchronization Signal (NB-SSS) comprising long ZC sequences mapped to one or multiple sets of consecutive NSSS OFDM symbols that are spread across one or multiple NB-SSS subframes, and wherein the root index of the NB-SSS is used to denote the physical cell ID (PCID) of the transmitting cell.

Example 8 may include an apparatus comprising means to perform one or more elements of a method described in or related to any of examples 1-7, or any other method or process described herein.

Example 9 may include one or more non-transitory computer-readable media comprising instructions to cause an electronic device, upon execution of the instructions by one or more processors of the electronic device, to perform one or more elements of a method described in or related to any of examples 1-7, or any other method or process described herein.

Example 10 may include an apparatus comprising logic, modules, and/or circuitry to perform one or more elements of a method described in or related to any of examples 1-7, or any other method or process described herein.

Example 11 may include a method, technique, or process as described in or related to any of examples 1-7, or portions or parts thereof.

Example 12 may include an apparatus comprising: one or more processors and one or more computer readable media comprising instructions that, when executed by the one or more processors, cause the one or more processors to perform the method, techniques, or process as described in or related to any of examples 1-7, or portions thereof.

Example 13 may include a method of communicating in a wireless network as shown and described herein.

Example 14 may include a system for providing wireless communication as shown and described herein.

Example 15 may include a device for providing wireless communication as shown and described herein.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

Further Examples

Example 1 may include a system and/or a method of wireless communication which may be carried on one or more computer-readable media having instructions that, when executed, cause an evolved NodeB (eNB) to perform operations to transmit synchronization signals for time and frequency synchronization between the eNB and user equipments (UEs) for narrowband Internet of things (NB-IoT). The operations of the method are comprising concatenating a plurality of short Zadoff-Chu (ZC) sequences each having a different root index, the ZC sequences being ordered to indicate an offset for use by a UE, generating an NB-IoT Primary Synchronization Signal (NB-PSS) using the concatenation of short Zadoff-Chu (ZC) sequences, and transmitting the resulting NB-PSS by the eNB in a periodic manner to the UE, wherein, the offset is identified by the order of the ZC sequences.

Example 2 may include the method of example 1 and/or other examples herein, wherein transmitting comprises transmitting a single NB-PSS over multiple subframes in an NB-frame.

Example 3 may include the method of example 1 and/or other examples herein, wherein generating comprises generating in the frequency domain and the NB-PSS is spread across multiple symbols in time.

Example 4 may include the method of example 1 and/or other examples herein, wherein the ZC sequences are a prime number of ZC sequences.

Example 5 may include the method of example 1 and/or other examples herein, wherein the NB-PSS is formed of symbol pairs and each symbol pair has a ZC sequence and a complex conjugate of the same ZC sequence.

Example 6 may include the method of example 5 and/or other examples herein, wherein the last symbol of the sequence of symbols is a repeat of the previous symbol if the number of multiple symbols used to map the NB-PSS is odd.

Example 7 may include the method of example 5 and/or other examples herein, wherein the offset is a frequency offset that comprises a local oscillator offset and a channel raster offset.

Example 8 may include the method of example 1 and/or other examples herein, wherein the NB-PSS is formed of symbol pairs and each symbol pair has a ZC sequence and a complex conjugate of the same ZC sequence wherein the ordering of the ZC sequence conveys information about the channel raster offset.

Example 9 may include the method of example 1 and/or other examples herein, wherein the NB-PSS is formed of symbol pairs and each symbol pair has a ZC sequence and a complex conjugate of the same ZC sequence wherein the ordering of the ZC sequence is reversed with respect to the complex conjugate of the ZC sequence to indicate one of two different channel raster offsets.

Example 10 may include baseband circuitry of an evolved NodeB (eNB) to perform operations to generate synchronization signals for time and frequency synchronization between the eNB and user equipments (UEs) for narrowband Internet of things (NB-IoT), the baseband circuitry configured to concatenate a plurality of short Zadoff-Chu (ZC) sequences each having a different root index, the ZC sequences being ordered to indicate an offset for use by a UE, generate an NB-Iot Primary Synchronization Signal (NB-PSS) using the concatenation of short Zadoff-Chu (ZC) sequences, and multiplex the resulting NB-PSS by the eNB in a periodic manner to the UE, wherein, the offset is identified by the order of the ZC sequences.

Example 11 may include the baseband circuitry of example 10 and/or other examples herein, wherein the NB-PSS is formed of symbol pairs and each symbol pair has a ZC sequence and a complex conjugate of the same ZC sequence and wherein the ordering of the ZC sequence conveys information about the channel raster offset.

Example 12 may include the baseband circuitry of example 10 and/or other examples herein, wherein the offset is a frequency offset that comprises a local oscillator offset and a channel raster offset.

Example 13 may include an evolved NodeB having the baseband circuitry of any one or more of examples 10-12 and/or other examples herein.

Example 14 may include a system and/or a method of wireless communication which may be carried on one or more computer-readable media having instructions that, when executed, cause an evolved NodeB (eNB) to perform operations to transmit synchronization signals for time and frequency synchronization between the eNB and user equipments (UEs) for narrowband Internet of things (NB-IoT). The operations of the method are comprising selecting a long Zadoff-Chu (ZC) sequence having a root index, the root index indicating a cell ID, generating an NB-IoT Secondary Synchronization Signal (NB-SSS) using the selected long Zadoff-Chu (ZC) sequence, and transmitting the resulting NB-SSS by the eNB across multiple subframes to the UE, wherein, the eNB has a cell identifier and the cell is identified by the root index of the ZC sequence.

Example 15 may include the method of example 14 and/or other examples herein, wherein the NB-SSS is comprised of a sequence of OFDM symbols and wherein the long ZC sequence is mapped to multiple sets of consecutive OFDM symbols of the NB-SSS.

Example 16 may include the method of example 14 and/or other examples herein, wherein transmitting the multiple sets of symbols comprises transmitting the multiple sets of symbols within a single NB-frame corresponding to a predefined period of time.

Example 17 may include the method of example 16 and/or other examples herein, wherein transmitting the multiple sets of symbols comprises transmitting the multiple sets of symbols in a last 11 sub-blocks of a physical resource block of the NB-frame.

Example 18 may include the method of example 14 and/or other examples herein, wherein generating comprises selecting a ZC sequence that has a length equal to the highest prime number that is less than a product of the allocated number of consecutive symbols, the allocated number of subcarriers, and the allocated number of subframes for the NB-frame.

Example 19 may include the method of example 18 and/or other examples herein, wherein generating further comprises applying cyclic extension or zero padding to the selected ZC sequence to extend the ZC sequence to have a length equal to the product.

Example 20 may include the method of example 14 and/or other examples herein, wherein generating comprises selecting a ZC sequence that has a length equal to the lowest prime number that is more than a product of the allocated number of consecutive symbols, the allocated number of subcarriers, and the allocated number of subframes for the NB-frame.

Example 21 may include the method of example 20 and/or other examples herein, wherein generating further comprises truncating the ZC sequence to have a length equal to the product.

Example 22 may include the method of example 18 and/or other examples herein, wherein generating comprises scrambling the ZC sequence using a scrambling sequence in order to carry a portion of the Cell ID or applying using frequency domain cyclic shifts to the ZC sequence in order to carry a portion of the cell ID.

Example 23 may include baseband circuitry of an evolved NodeB (eNB) to perform operations to generate synchronization signals for time and frequency synchronization between the eNB and user equipments (UEs) for narrowband Internet of things (NB-Iot), the baseband circuitry configured to select a long Zadoff-Chu (ZC) sequence having a root index, the root index indicating a cell ID, generate an NB-IoT Secondary Synchronization Signal (NB-SSS) using the selected long Zadoff-Chu (ZC) sequence, and multiplex the resulting NB-SSS by the eNB across multiple subframes to the UE, wherein, the eNB has a cell identifier and the cell is identified by the root index of the ZC sequence.

Example 24 may include the baseband circuitry of claim 23 and/or other examples herein, wherein the NB-SSS is comprised of a sequence of OFDM symbols and wherein the long ZC sequence is mapped to multiple sets of consecutive OFDM symbols of the NB-SSS.

Example 25 may include the baseband circuitry of claim 23 and/or other examples herein, wherein generating comprises selecting a ZC sequence that has a length equal to the highest prime number that is less than a product of the allocated number of consecutive symbols, the allocated number of subcarriers, and the allocated number of subframes for the NB-frame and applying cyclic extension or zero padding to the selected ZC sequence to extend the ZC sequence to have a length equal to the product.

Example 26 may include an evolved NodeB having the baseband circuitry of any one or more of claims 23-25 and/or other examples herein.

Example 27 may include an evolved NodeB (eNB) to perform operations to transmit synchronization signals for time and frequency synchronization between the eNB and user equipments (UEs) for narrowband Internet of things (NB-Iot) comprising means for concatenating a plurality of short Zadoff-Chu (ZC) sequences each having a different root index, the ZC sequences being ordered to indicate an offset for use by a UE, means for generating an NB-Iot Primary Synchronization Signal (NB-PSS) using the concatenation of short Zadoff-Chu (ZC) sequences, and means for transmitting the resulting NB-PSS by the eNB in a periodic manner to the UE, wherein, the offset is identified by the order of the ZC sequences.

Example 27 may include the apparatus of example 26 and/or other examples herein, transmitting comprises transmitting a single NB-PSS over multiple subframes in an NB-frame.

Example 28 may include the apparatus of example 26 and/or other examples herein, wherein generating comprises generating in the frequency domain and the NB-PSS is spread across multiple symbols in time.

Example 29 may include the apparatus of examples 26 and/or other examples herein, wherein the ZC sequences are a prime number of ZC sequences.

Example 30 may include the apparatus of examples 26 and/or other examples herein, wherein the NB-PSS is formed of symbol pairs and each symbol pair has a ZC sequence and a complex conjugate of the same ZC sequence.

Example 31 may include the apparatus of example 30 and/or other examples herein, wherein the last symbol of the sequence of symbols is a repeat of the previous symbol if the number of multiple symbols used to map the NB-PSS is odd.

Example 32 may include the apparatus of examples 26 and/or other examples herein, wherein the offset is a frequency offset that comprises a local oscillator offset and a channel raster offset.

Example 33 may include the apparatus of examples 26 and/or other examples herein, wherein the NB-PSS is formed of symbol pairs and each symbol pair has a ZC sequence and a complex conjugate of the same ZC sequence wherein the ordering of the ZC sequence conveys information about the channel raster offset.

Example 34 may include the apparatus of examples 26 and/or other examples herein, wherein the NB-PSS is formed of symbol pairs and each symbol pair has a ZC sequence and a complex conjugate of the same ZC sequence wherein the ordering of the ZC sequence is reversed with respect to the complex conjugate of the ZC sequence to indicate one of two different channel raster offsets.

Example 35 may include an evolved NodeB (eNB) to perform operations to transmit synchronization signals for time and frequency synchronization between the eNB and user equipments (UEs) for narrowband Internet of things (NB-IoT) comprising means for selecting a long Zadoff-Chu (ZC) sequence having a root index, the root index indicating a cell ID, means for generating an NB-IoT Secondary Synchronization Signal (NB-SSS) using the selected long Zadoff-Chu (ZC) sequence, and means for transmitting the resulting NB-SSS by the eNB across multiple subframes to the UE, wherein, the eNB has a cell identifier and the cell is identified by the root index of the ZC sequence.

Example 36 may include the apparatus of example 35 and/or other examples herein, wherein the NB-SSS is comprised of a sequence of OFDM symbols and wherein the long ZC sequence is mapped to multiple sets of consecutive OFDM symbols of the NB-SSS.

Example 37 may include the apparatus of example 35 and/or other examples herein, wherein transmitting the multiple sets of symbols comprises transmitting the multiple sets of symbols within a single NB-frame corresponding to a predefined period of time.

Example 38 may include the apparatus of example 37 and/or other examples herein, wherein transmitting the multiple sets of symbols comprises transmitting the multiple sets of symbols in a last 11 sub-blocks of a physical resource block of the NB-frame.

Example 39 may include the apparatus of examples 35 and/or other examples herein, wherein generating comprises selecting a ZC sequence that has a length equal to the highest prime number that is less than a product of the allocated number of consecutive symbols, the allocated number of subcarriers, and the allocated number of subframes for the NB-frame.

Example 40 may include the apparatus of example 39 and/or other examples herein, wherein generating further comprises applying cyclic extension or zero padding to the selected ZC sequence to extend the ZC sequence to have a length equal to the product.

Example 41 may include the apparatus of example 35 and/or other examples herein, wherein generating comprises selecting a ZC sequence that has a length equal to the lowest prime number that is more than a product of the allocated number of consecutive symbols, the allocated number of subcarriers, and the allocated number of subframes for the NB-frame.

Example 42 may include the apparatus of examples 35 and/or other examples herein, wherein generating further comprises truncating the ZC sequence to have a length equal to the product.

Example 43 may include the apparatus of example 42 and/or other examples herein, wherein generating comprises scrambling the ZC sequence using a scrambling sequence in order to carry a portion of the Cell ID or applying using frequency domain cyclic shifts to the ZC sequence in order to carry a portion of the cell ID.

The invention claimed is:

1. One or more non-transitory computer-readable media having instructions that, when executed, cause an evolved NodeB (eNB) to perform operations to transmit synchronization signals for time and frequency synchronization between the eNB and one or more user equipments (UEs) for narrowband Internet of Things (NB-IoT) comprising:
   concatenating a plurality of short Zadoff-Chu (ZC) sequences each having a different root index, the ZC sequences being ordered to indicate an offset for use by a UE;
   generating an NB-IoT Primary Synchronization Signal (NB-PSS) using the concatenation of short ZC sequences; and
   transmitting the resulting NB-PSS by the eNB in a periodic manner to the UE, wherein, the offset is identified by the order of the ZC sequences in the concatenation of short ZC sequences each having a different root index.

2. The media of claim 1, wherein transmitting comprises transmitting a single NB-PSS over multiple subframes in an NB-frame.

3. The media of claim 1, wherein generating comprises generating in the frequency domain and the NB-PSS is spread across multiple symbols in time.

4. The media of claim 1, wherein the concatenation of short ZC sequences is a prime number of ZC sequences.

5. The media of claim 1, wherein the NB-PSS is formed of symbol pairs and each symbol pair has a ZC sequence and a complex conjugate of the same ZC sequence.

6. The media of claim 5, wherein the last symbol of the sequence of symbols is a repeat of the previous symbol if the number of multiple symbols used to map the NB-PSS is odd.

7. The media of claim 1, wherein the offset is a frequency offset that comprises a local oscillator offset and a channel raster offset.

8. The media of claim 1, wherein the NB-PSS is formed of symbol pairs and each symbol pair has a ZC sequence and a complex conjugate of the same ZC sequence wherein the ordering of the ZC sequence conveys information about the channel raster offset.

9. The media of claim 1, wherein the NB-PSS is formed of symbol pairs and each symbol pair has a ZC sequence and a complex conjugate of the same ZC sequence wherein the ordering of the ZC sequence is reversed with respect to the complex conjugate of the ZC sequence to indicate one of two different channel raster offsets.

10. Baseband circuitry of an evolved NodeB (eNB) to perform operations to generate synchronization signals for time and frequency synchronization between the eNB and user equipments (UEs) for narrowband Internet of Things (NB-IoT), the baseband circuitry configured to:
    concatenate a plurality of short Zadoff-Chu (ZC) sequences each having a different root index, the ZC sequences being ordered to indicate an offset for use by a UE;
    generate an NB-IoT Primary Synchronization Signal (NB-PSS) using the concatenation of short ZC sequences; and
    multiplex the resulting NB-PSS by the eNB in a periodic manner to the UE, wherein, the offset is identified by the order of the ZC sequences in the concatenation of short ZC sequences each having a different root index.

11. The baseband circuitry of claim 10, wherein the NB-PSS is formed of symbol pairs and each symbol pair has a ZC sequence and a complex conjugate of the same ZC sequence and wherein the ordering of the ZC sequence conveys information about the channel raster offset.

12. The baseband circuitry of claim 10, wherein the offset is a frequency offset that comprises a local oscillator offset and a channel raster offset.

13. An evolved NodeB having the baseband circuitry of claim 10.

14. A method for a base station to perform operations to transmit synchronization signals for time and frequency synchronization between the base station and one or more user equipments (UEs) for narrowband Internet of Things (NB-IoT), comprising:
    concatenating a plurality of short Zadoff-Chu (ZC) sequences each having a different root index, the ZC sequences being ordered to indicate an offset for use by a UE;
    generating an NB-IoT Primary Synchronization Signal (NB-PSS) using the concatenation of short ZC sequences; and
    transmitting the resulting NB-PSS by the eNB in a periodic manner to the UE, wherein, the offset is identified by the order of the ZC sequences in the concatenation of short ZC sequences each having a different root index.

15. The method of claim 14, wherein transmitting comprises transmitting a single NB-PSS over multiple subframes in an NB-frame.

16. The method of claim 14, wherein generating comprises generating in the frequency domain and the NB-PSS is spread across multiple symbols in time.

17. The method of claim 14, wherein the concatenation of short ZC sequences is a prime number of ZC sequences.

18. The method of claim 14, wherein the NB-PSS is formed of symbol pairs and each symbol pair has a ZC sequence and a complex conjugate of the same ZC sequence.

19. The method of claim 18, wherein the last symbol of the sequence of symbols is a repeat of the previous symbol if the number of multiple symbols used to map the NB-PSS is odd.

20. The method of claim 14, wherein the offset is a frequency offset that comprises a local oscillator offset and a channel raster offset.

21. The method of claim 14, wherein the NB-PSS is formed of symbol pairs and each symbol pair has a ZC sequence and a complex conjugate of the same ZC sequence wherein the ordering of the ZC sequence conveys information about the channel raster offset.

22. The method of claim 14, wherein the NB-PSS is formed of symbol pairs and each symbol pair has a ZC sequence and a complex conjugate of the same ZC sequence wherein the ordering of the ZC sequence is reversed with respect to the complex conjugate of the ZC sequence to indicate one of two different channel raster offsets.

* * * * *